(12) United States Patent
Peterson et al.

(10) Patent No.: US 7,145,657 B2
(45) Date of Patent: Dec. 5, 2006

(54) COLOR MEASUREMENT INSTRUMENT

(75) Inventors: Steven H. Peterson, Wyoming, MI (US); Robert A. Lamfers, Hudsonville, MI (US)

(73) Assignee: X-Rite, Incorporated, Grandville, MI (US)

( * ) Notice: Subject to any disclaimer, the term of this patent is extended or adjusted under 35 U.S.C. 154(b) by 0 days.

(21) Appl. No.: 11/370,670

(22) Filed: Mar. 8, 2006

(65) Prior Publication Data

US 2006/0152725 A1    Jul. 13, 2006

Related U.S. Application Data

(62) Division of application No. 10/669,110, filed on Sep. 23, 2003.

(51) Int. Cl.
    *G01J 3/50*    (2006.01)
(52) U.S. Cl. .................................... 356/402
(58) Field of Classification Search ................. 356/402
    See application file for complete search history.

(56) References Cited

U.S. PATENT DOCUMENTS

| | | |
|---|---|---|
| 3,715,163 A | 2/1973 | Mitchell |
| 3,910,701 A | 10/1975 | Henderson et al. |
| 4,111,556 A | 9/1978 | Grisar et al. |
| 4,553,033 A | 11/1985 | Hubble, III et al. |
| 4,568,191 A | 2/1986 | Barry |
| 4,687,335 A | 8/1987 | Zupanick et al. |
| 4,917,500 A | 4/1990 | Lugos |
| 4,964,692 A | 10/1990 | Prescott |
| 4,986,665 A | 1/1991 | Yamanishi et al. |
| 4,989,985 A | 2/1991 | Hubble, III et al. |
| 5,078,497 A | 1/1992 | Borton et al. |
| 5,137,364 A | 8/1992 | McCarthy |
| 5,150,174 A | 9/1992 | Ryczek et al. |
| 5,210,590 A | 5/1993 | Landa et al. |
| 5,266,792 A | 11/1993 | Crowne et al. |
| 5,272,518 A | 12/1993 | Vincent |
| 5,303,037 A | 4/1994 | Taranowski |
| 5,377,000 A | 12/1994 | Berends |
| 5,526,190 A | 6/1996 | Hubble, III et al. |
| 5,604,567 A | 2/1997 | Dundas et al. |
| 5,612,902 A | 3/1997 | Stokes |
| 5,671,059 A | 9/1997 | Vincent |
| 5,748,221 A | 5/1998 | Castelli et al. |

(Continued)

OTHER PUBLICATIONS

Keyence Corporation, "Color-Differentiating Fiberoptic Sensor" product brochure, Dec. 2002, pp. 1-8.

(Continued)

*Primary Examiner*—F. L. Evans
(74) *Attorney, Agent, or Firm*—Kirkpatrick & Lockhart Nicholson Graham LLP

(57) ABSTRACT

An LED-based color measurement instrument including an illumination system and a sensing system. The illumination system includes modulated LEDs and a temperature control system for regulating the temperature of the LEDs, thereby improving the consistency of their performance. The sensing system includes a photodiode, a transimpedance amplifier, and an integrator in the first stage to cancel the effect of ambient light on the output of the first stage. The sensing system also includes a lens system for imaging a target area of the target sample onto the photo sensor in a manner so that the product of the target area times the solid angle captured by the lens system is generally uniform over a selected range of distances, thereby reducing the positional sensitivity of the instrument with respect to the target sample.

15 Claims, 10 Drawing Sheets

U.S. PATENT DOCUMENTS

| | | | |
|---|---|---|---|
| 5,838,451 | A | 11/1998 | McCarthy |
| 5,844,680 | A | 12/1998 | Sperling |
| 5,963,244 | A | 10/1999 | Mestha et al. |
| 5,963,333 | A | 10/1999 | Walowit et al. |
| 5,982,957 | A | 11/1999 | DeCaro et al. |
| 6,020,583 | A | 2/2000 | Walowit et al. |
| 6,147,761 | A | 11/2000 | Walowit et al. |
| 6,157,454 | A | 12/2000 | Wagner et al. |
| 6,157,469 | A | 12/2000 | Mestha |
| 6,178,007 | B1 | 1/2001 | Harrington |
| 6,351,308 | B1 | 2/2002 | Mestha |
| 6,373,568 | B1 | 4/2002 | Miller et al. |
| 6,384,918 | B1 | 5/2002 | Hubble, III et al. |
| 6,405,929 | B1 | 6/2002 | Ehrhart et al. |
| 6,419,340 | B1 | 7/2002 | Wickham et al. |
| 6,538,770 | B1 | 3/2003 | Mestha |
| 6,556,300 | B1 | 4/2003 | Tandon et al. |
| 6,567,170 | B1 | 5/2003 | Tandon et al. |
| 6,574,425 | B1 | 6/2003 | Weiss et al. |
| 6,603,551 | B1 | 8/2003 | Mestha et al. |
| 2002/0191183 | A1 | 12/2002 | Tandon et al. |
| 2002/0191188 | A1 | 12/2002 | Hubble, III et al. |
| 2003/0048449 | A1 | 3/2003 | Vander Jagt et al. |
| 2003/0063275 | A1 | 4/2003 | Hubble, III e al. |
| 2003/0067502 | A1 | 4/2003 | Arquilevich et al. |
| 2003/0086090 | A1 | 5/2003 | Tandon et al. |
| 2003/0122502 | A1 | 7/2003 | Clauberg et al. |
| 2003/0132982 | A1 | 7/2003 | Tandon et al. |
| 2003/0142314 | A1 | 7/2003 | Hubble, III et al. |

OTHER PUBLICATIONS

Delta Computer Systems, "CS64A Color Sensors," product brochure, 2001, pp. 1-22.

Keyence Corporation, "Highly Advanced RGB Digital Fiberoptic Sensor," downloaded from http://world.keyence.com/newprod/cz_k.html, Aug. 15, 2002, pp. 1-8.

Vydas International Marketing, "Programmable Colour Sensor," downloaded from http://www.ssensorsforindustry.com/prod21.htm, Aug. 12, 2002, pp. 1-4.

Sick Optic Electronics, "CS1 Color Sensor," product brochure, 612003, pp. 364-369.

Balluff Inc., "Inductive Sensors 2002: The NEW BFS-26K Sees Your True Colors!," downloaded from http://www.balluff.com/BFS/default.htm, Aug. 12, 2002.

Sensor Instruments GmbH, "SI-COLO Series," downloaded from http://www.johnkopplin.com/si-colo2-30-e.pdf, Jan. 25, 2002.

Zand, et al, "Transimpedance Amplifier with Differential Photodiode Current Sensing," Univ. of Toronto Dept. of Electrical and Computer Engineering, vol. 2, 1999, pp. 624-627.

Burr-Brown Corporation, "Monolithic Photodiode and Amplifier," product brochure, 1994, pp. 1-9.

Linear Technology, "Low Noise, Picoampere Bias Current, JFET input OP AMP," product brochure, 1999, pp. 1-12.

COLOR MEASUREMENT INSTRUMENT

CROSS-REFERENCE TO RELATED APPLICATION

This application is a division of U.S. patent application Ser. No. 10/669,110, filed Sep. 23, 2003.

BACKGROUND

The present invention relates to color measurement instruments, and more particularly to color measurement instruments that include modulated LEDs as illumination sources.

A variety of color measurement instruments are well known and widely used in a variety of applications to measure color. Some of these instruments illuminate the target sample sequentially with a plurality of monochrome illuminators, measure the light reflected by the target sample to each of the monochrome illuminators, and determine the color of the target sample based on all of the measurements.

Light emitting diodes (LEDs) have been used as the monochrome illuminators. Original instruments included red, green, and blue LEDs. More recent instruments include more than three LEDs; and some include as many as eight.

In such instruments, the LEDs are typically modulated at predetermined frequencies so that the sensing circuit can discriminate between light reflected from the LEDs, which is of interest, and light reflected from ambient light, which is not of interest. The sensing circuit can ignore the ambient component by looking only at reflected light received at the predetermined frequencies.

Several problems exist in current LED-based instruments. A first problem is that the output of the LEDs varies with the temperature of the LEDs. Specifically, the output changes in terms of intensity, spectral energy distribution, and the spatial distribution of the output. The temperature changes are attributable both to the ambient temperature and the amount of time that the LEDs are illuminated. Unfortunately, this variation in LED output adversely impacts the accuracy of the color measurement.

A second problem is that the ambient light component can saturate the transimpedance amplifiers in the sensing circuit and thereby limit dynamic range, particularly in the first stage. Prior artisans have addressed this problem by placing a shunt element in opposition to the photodiode, integrating the output of the transimpedance amplifier at a frequency less than the ambient light frequencies, and using the integrated signal to control the shunt to act as a current sink for the frequencies of the ambient light. While this is an effective way to cancel the effects of an extremely wide dynamic range of ambient light, it also is inherently noisy and sensitive to loop gain and bandwidth issues. Consequently, measurements include errors of an undesirable magnitude.

A third problem is that the distance between the instrument and the sample is a critical factor that must be precisely controlled. This critical factor is known as positional sensitivity. Because the optics of such instruments are typically tuned to a precise distance, variations in that distance typically detract from the accuracy of measurements. Unfortunately, positional accuracy is not a practical possibility in industrial applications, where positional repeatability varies to some degree because moving components, such as robotics, cannot always be positioned precisely.

SUMMARY

The aforementioned problems are overcome in the present invention in which an LED-based color measurement system provides previously unavailable measurement accuracy in an LED-based instrument. As with all LED-based instruments, the instrument includes an illumination system and a sensor system. The illumination system includes a plurality of monochrome LEDs modulated at preselected frequencies for illuminating a target sample. The sensor system includes a light-sensitive device for measuring the strength of the light reflected from the target sample and for separating the signal of interest from the ambient component.

In a first aspect of the invention, the illumination system includes an active temperature control system for the LEDs. More specifically, the temperature control system includes a sensor for measuring the temperature of the LEDs, a temperature-changing device (e.g. a heater) for changing the temperature of the LEDs, and a controller for driving the temperature-changing device in response to the temperature-sensing device. The temperature of the LEDs can be held at a relatively constant value; and, therefore, the outputs of the LEDs are constant—both in terms of frequency and intensity.

In a second aspect of the invention, the sensing system includes a photo-sensor, a transimpedance amplifier connected across the photo-sensor, and an integrator having an input connected to the amplifier output, and an output and connected to the photo-sensor and to one of the amplifier inputs. The integrator removes the ambient light contribution to the amplifier output by mirroring the signal attributable to the ambient light at the other amplifier input. Therefore the system provides ambient light rejection, but without the noise and sensitivity of prior systems.

In a third embodiment of the invention, the sensor system includes optics that reduce the positional sensitivity of the instrument with respect to the target sample. More particularly, a lens system is provided for imaging the target sample onto the photo-sensor. Within a predetermined distance range, the product of 1) the target area imaged onto the photo-sensor times 2) the solid angle captured by the lens is generally uniform. Consequently, the positional sensitivity of the instrument to the target sample is reduced.

These and other objects, advantages, and features of the invention will be more fully understood and appreciated by reference to the detailed description of the preferred embodiment and the drawings.

DETAILED DESCRIPTION

Figures 1, 2:
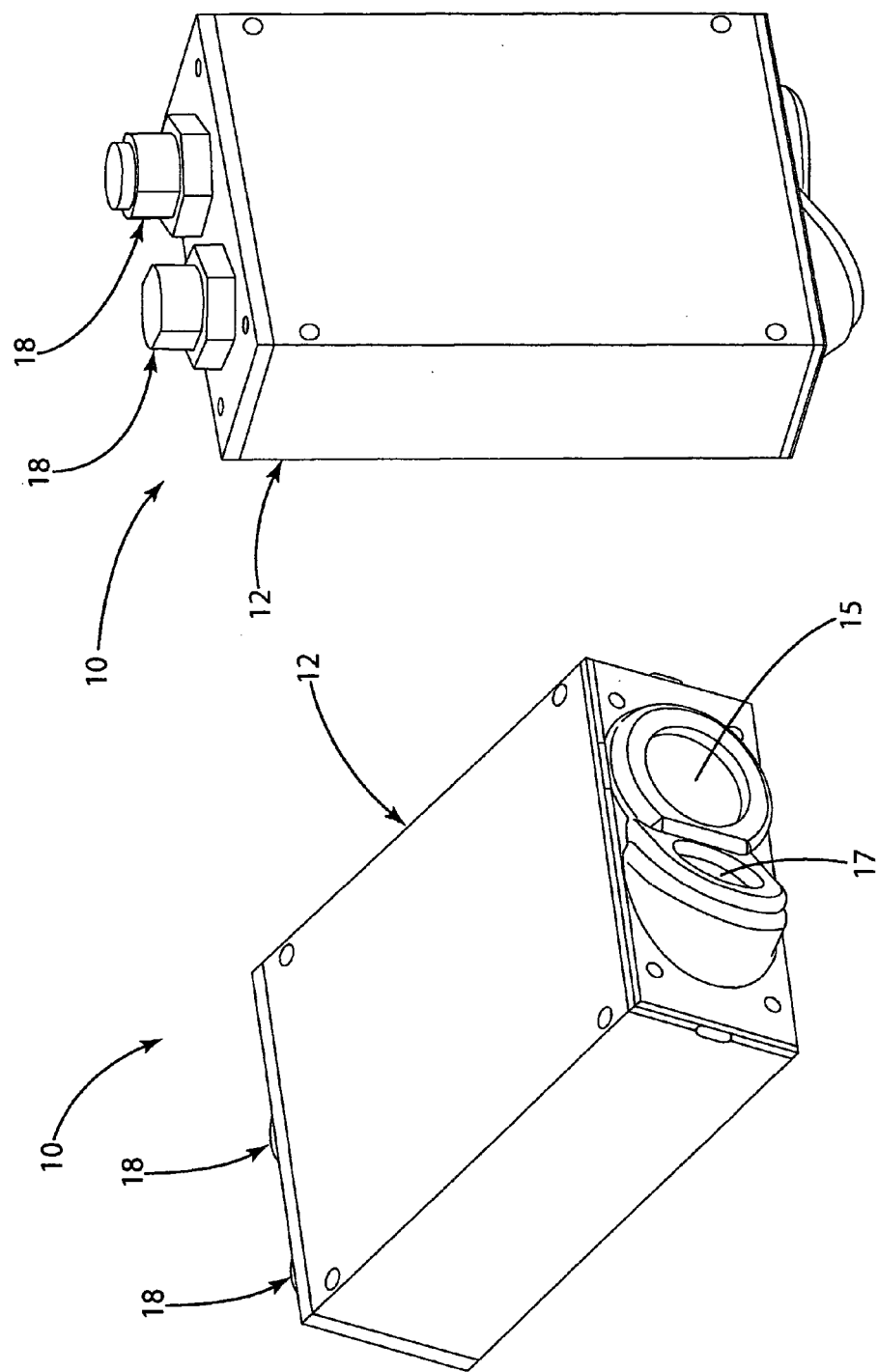
FIG. 1 is a front perspective view of the color measurement instrument.
FIG. 2 is a rear perspective view of the color measurement instrument.
Figure 3:
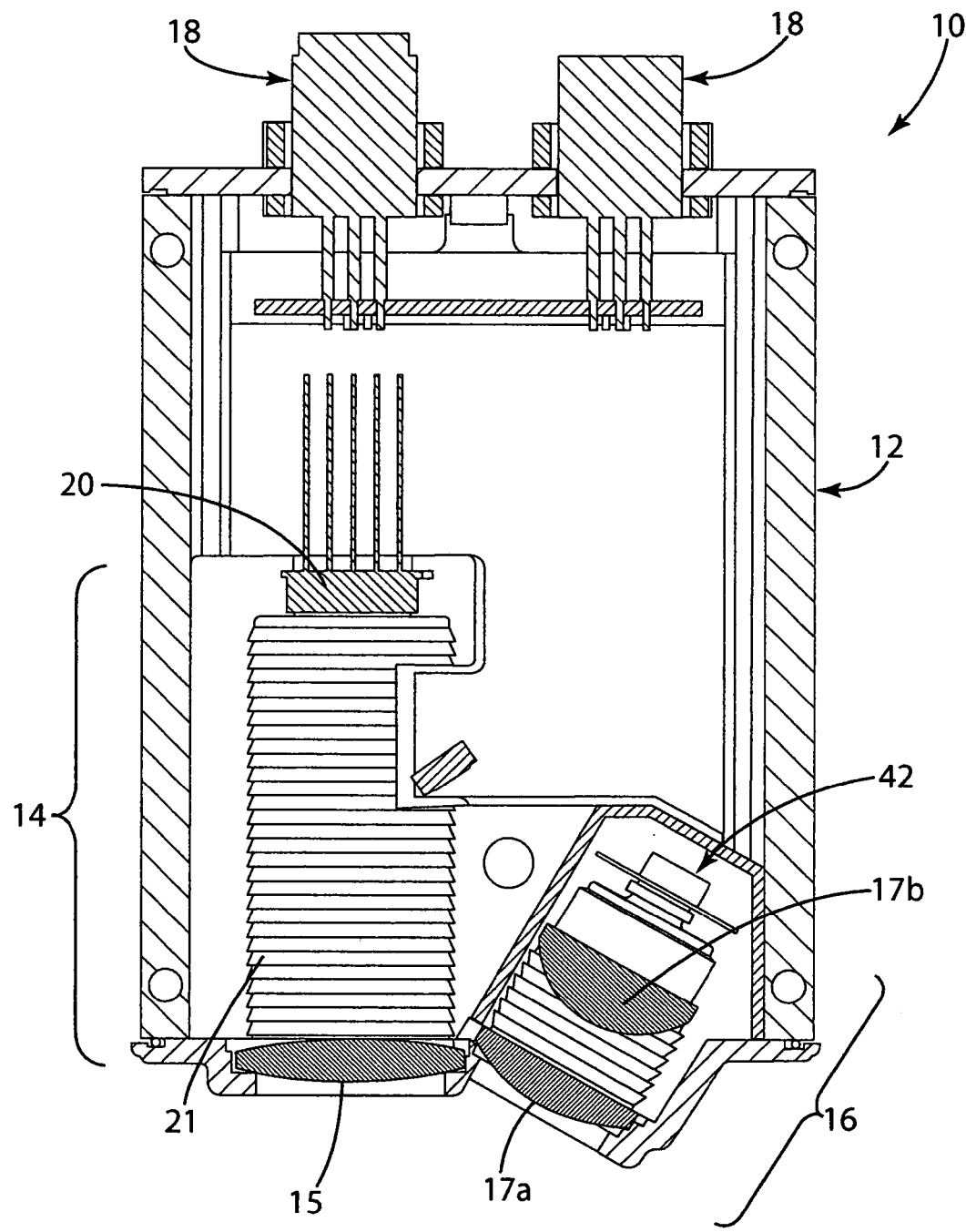
FIG. 3 is a plan view of the interior of the color measurement instrument.
Figure 5:
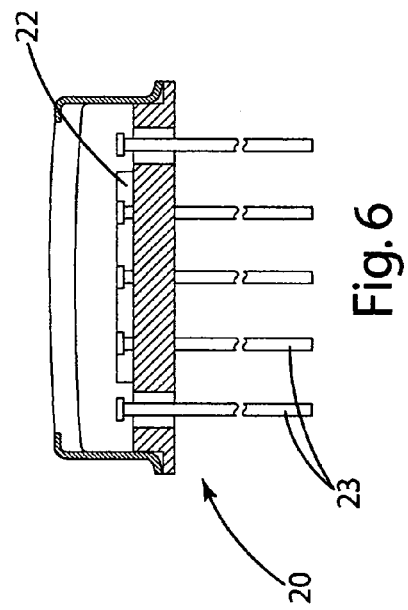
FIG. 5 is a top plan view of the LED illuminator package.
Figure 6:
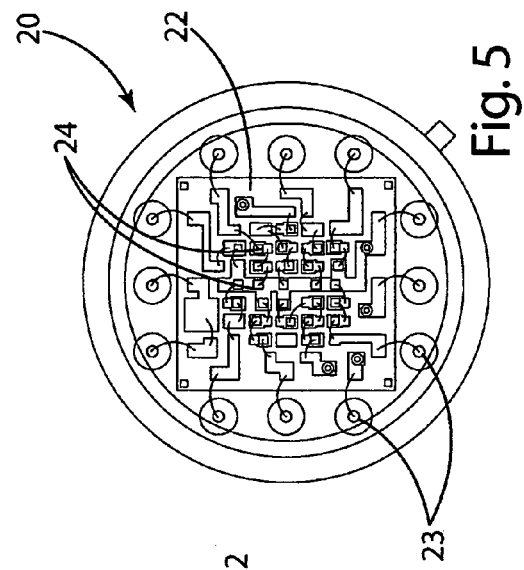
FIG. 6 is a sectional view of the LED illuminator package.
Figure 4:
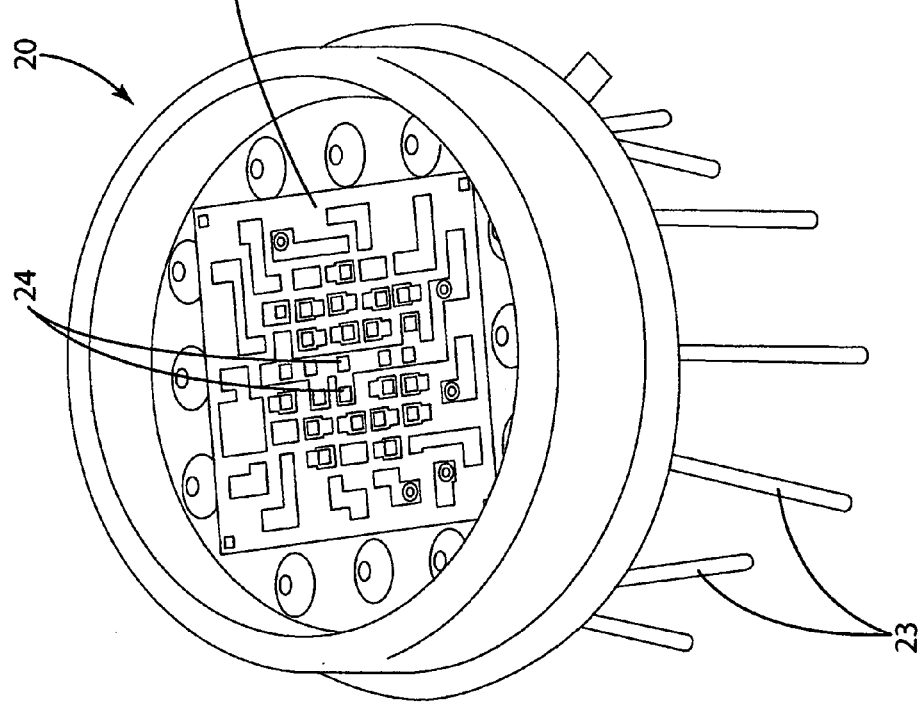
FIG. 4 is a perspective view of the LED illuminator package.
Figure 7:
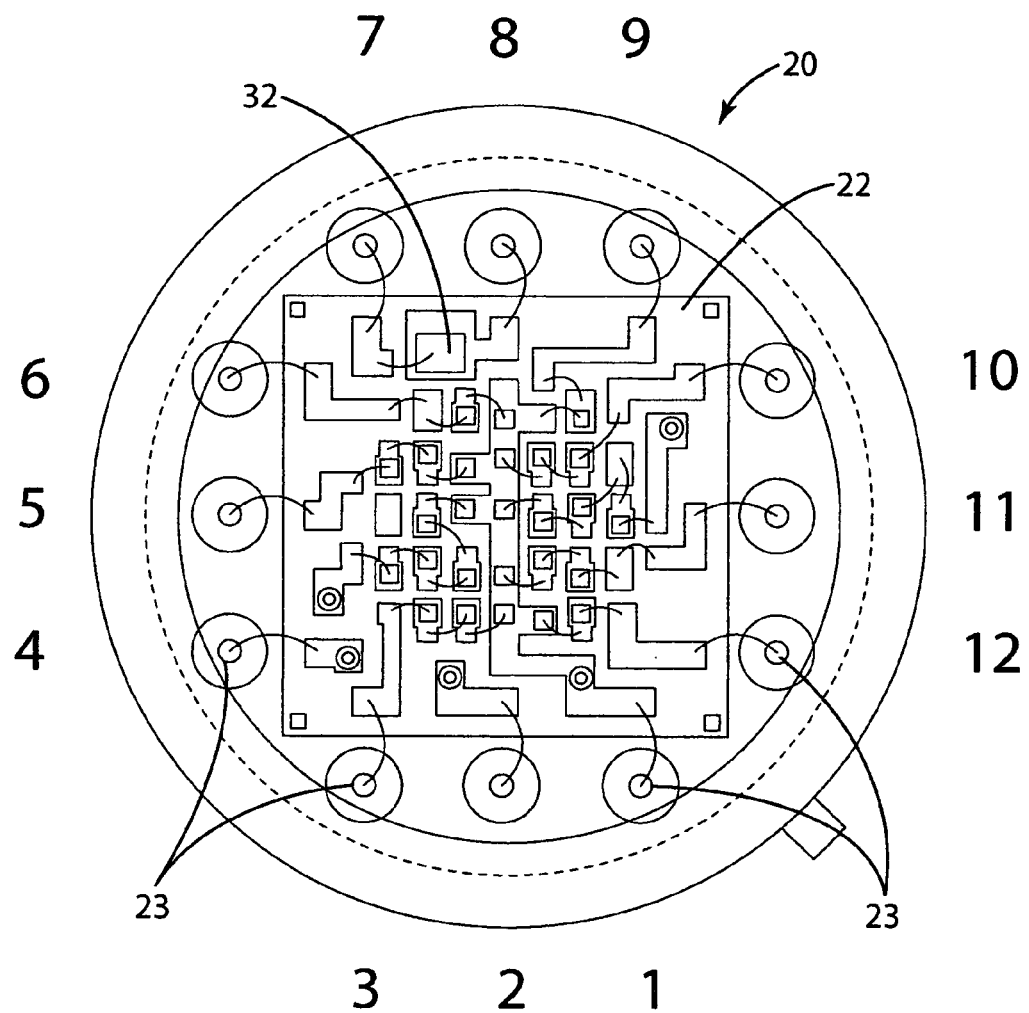
FIG. 7 is an enlarged view of FIG. 4.

A color measurement instrument constructed in accordance with a preferred embodiment of the invention is illustrated FIGS. 1–3 and generally designated 10. The instrument includes a housing 12, an illumination system 14 (FIG. 3), a sensor system 16 (FIG. 3), and communication/power ports 18.

The housing 12 is constructed using conventional techniques to provide a protective enclosure for the color measurement instrument 10. The housing 12, and the contents to be described, are designed and built to withstand the rigors of an industrial environment. Suitable housings 12 will be readily apparent to those skilled in the art. The communication/power ports 18 provide communication and power ports for the instrument 10. The ports 18 also are well known to those skilled in the art.

I. Illumination System

The illumination system includes an illuminator 20 (FIGS. 4–7), an anti-reflective tube 21 (FIG. 3), and lens 15 (FIGS. 1 and 3).

The illuminator package 20 is illustrated in FIGS. 4–7 and includes eight sets of different wavelength die-mounted LEDs on a TO-8, 12-pin header or "can" that enables each set of LEDs to be individually addressable. A total of twenty-seven LEDs is mounted on the header as follows:

TABLE 1

| Nominal Wavelength (nm) | Typical Peak Wavelength (nm) | # of LED Die Within Set | Typical Vf (V) @ 20 mA/die | Radiometric Flux (mW) @ 20 mA/die |
| --- | --- | --- | --- | --- |
| 405 | 400 | 2 | 7.37 | 5.79 |
| 470 | 469 | 3 | 11.77 | 8.07 |
| 505 | 508 | 2 | 7.44 | 3.66 |
| 527 | 519 | 3 | 11.18 | 5.89 |
| 570 | 575 | 10 | 12.03 | 3.87 |
| 590 | 592 | 3 | 5.93 | 4.71 |
| 630 | 628 | 3 | 5.51 | 4.56 |
| 660 | 661 | 1 | 1.86 | 4.14 |

Figure 8:
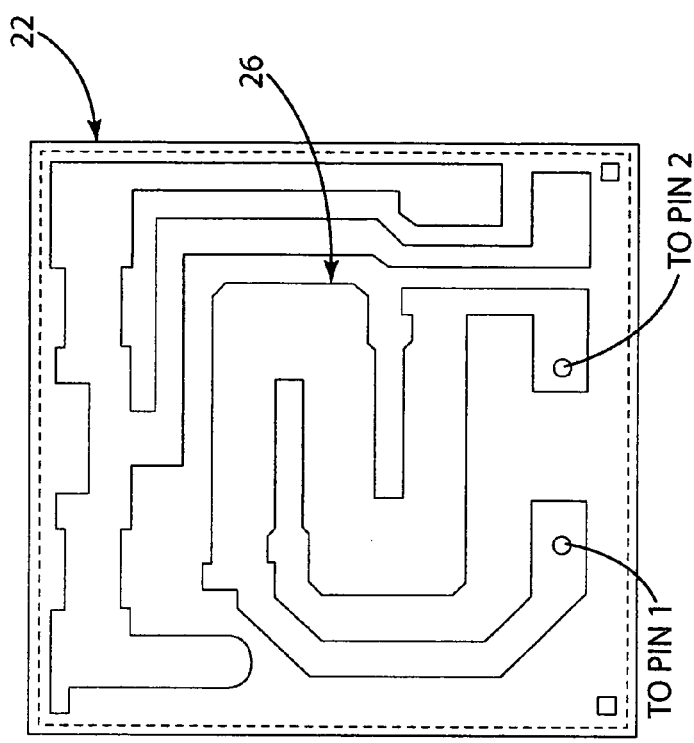
FIG. 8 is a rear plan view of the header carrying the LEDs.

The LED die are placed on an Alumina substrate inside of the TO-8 can. The substrate is adequately thermally conductive to enable uniform temperature distribution. A serpentine resistor or heater 26 (see FIG. 8) wraps across the back side of the LED substrate in on which the LEDs are mounted on the front side of the substrate. The heater 26 has a resistance (480 ohms in the current embodiment) that allows heating of the entire can from 0EC to 45EC in a reasonable waiting period. A thermistor 32 is mounted on the front side of the LED substrate and reports the temperature of the substrate and therefore of the LED die. Current is pulsed through the serpentine resistor 26 to keep the thermistor 32 at its target temperature.

The pin layout for the illuminator 20 is as follows:

TABLE 2

| Pin # | Function |
| --- | --- |
| 1 | Common Cathode "−" |
| 2 | 480 Ohm Serpentine "+"* |
| 3 | 470 nm Anode "+" |
| 4 | 570 nm Anode "+" |
| 5 | 570 nm Anode "+" |
| 6 | 405 nm Anode "+" |
| 7 | 1K Ohm Thermistor "−"* |
| 8 | 1K Ohm Thermistor "+"* |
| 9 | 660 nm Anode "+" |
| 10 | 630 nm Anode "+" |
| 11 | 590 nm Anode "+" |
| 12 | 505 nm Anode "+" |

*"+/−" Arbitrary for Resistor

Figure 9:
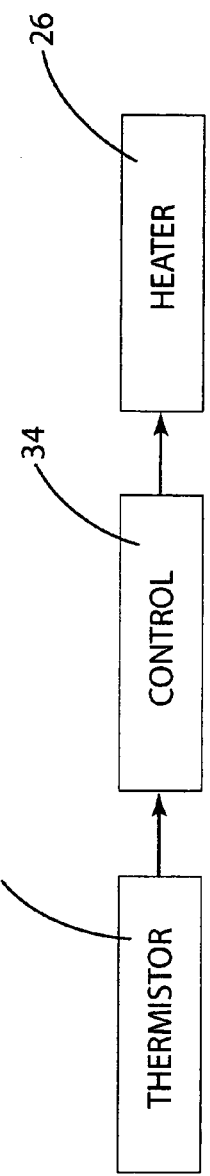
FIG. 9 is a schematic diagram of the temperature control system.

The heater control system is illustrated in FIG. 9. The system includes the thermistor 32, the serpentine resistor 26, and a control 34. The control 34 is operatively coupled to both the thermistor 32 and the heater 26 to control the heater. The control 34 periodically samples the thermistor 32, which n the current embodiment is every 50 milliseconds. If the temperature is below a predetermined target temperature, the heater is turned on. If the temperature is above the predetermined target temperature, the heater 26 is turned off.

There are three options in controlling temperature. The first is to heat the LEDs to some point above the operational ambient temperature range. The second is to cool the LEDs to some point below the operational ambient temperature range. The third is to ignore ambient temperature range and implement both heating and cooling. Each option has its advantages and disadvantages. Heating has the advantage of lowest cost, but the disadvantage that the LEDs are less efficient at higher temperatures. Cooling has the opposite advantages and disadvantages. The third option has the advantage of providing an ideal temperature, but the disadvantage of greatest cost. Based on the present ambient temperature range and economics, the present invention implements the first option of heating only.

The ambient temperature range of the current instrument is 0EC to 40EC. The target temperature for the header 22, and therefore the LEDs in the header, is selected to be 45EC so that the temperature of the header will always be above the temperature of the operating environment. Using the described control methodology, the temperature can be maintained within 0.1EC of the target temperature. Different target temperatures can be selected depending on the ambient range. Maintaining the LEDs at a uniform temperature enhances the uniformity of the output of the illuminator, including the intensity, the spectral energy distribution, and the spatial distribution of the output. While the temperature control concept has been described in conjunction with LEDs, the concept is applicable and adaptable to other temperature-sensitive illuminators.

Each of the LED sets is modulated at approximately 24 KHz, using techniques well know to those skilled in the art. This frequency is substantially above the frequency of virtually all known sources of ambient light.

Figure 10:
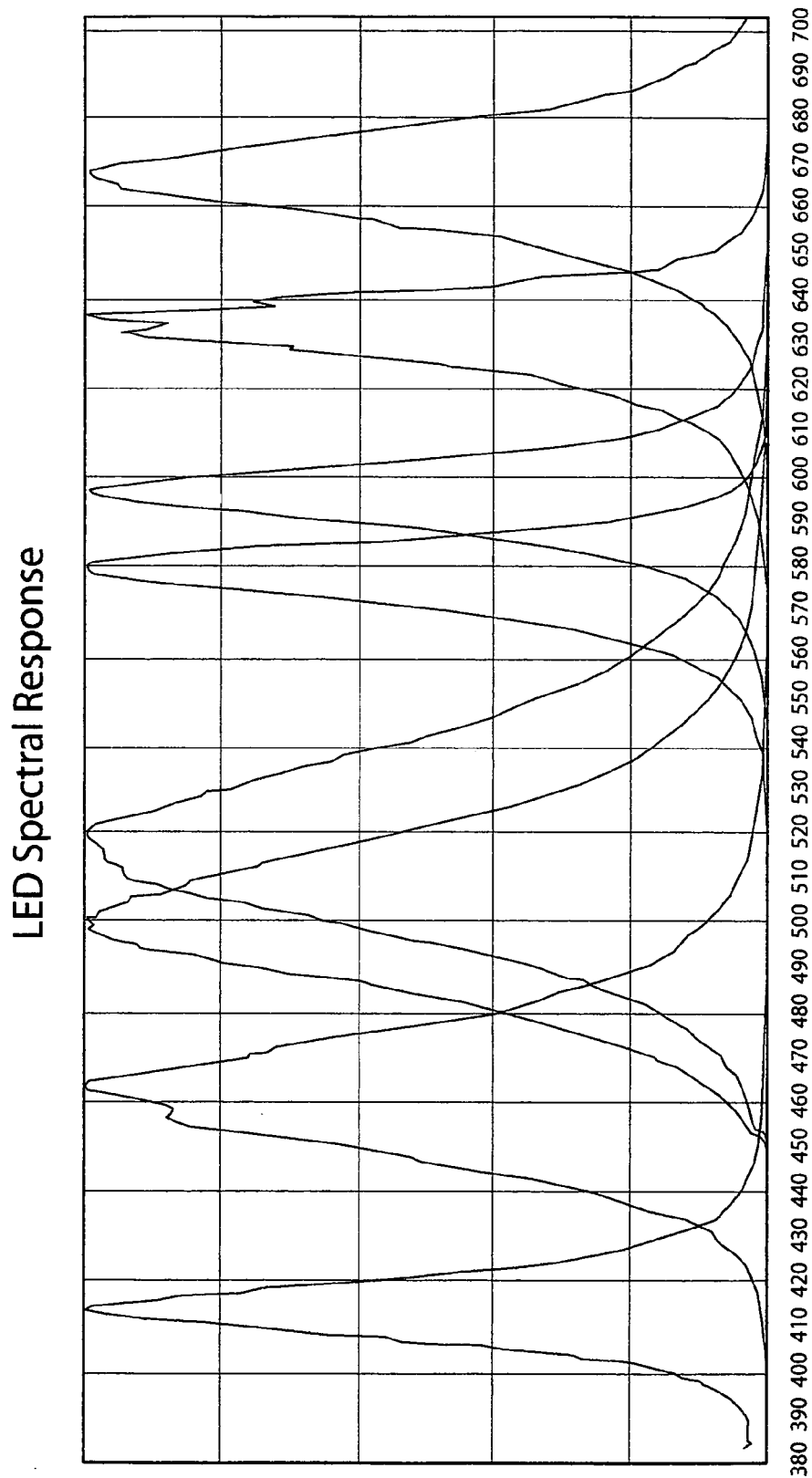
FIG. 10 is an illustration of the spectral coverage provided by the LED sets in the illuminator package.

The spectral output of the eight sets of LEDs is illustrated in FIG. 10. Each of the eight spectral curves corresponds to one of the sets of LEDs. As can be seen, the eight LED sets provide thorough coverage of the visible spectrum (i.e. between 400 nm and 700 nm) the particularly selected LEDs provide an appropriate compromise between spectral coverage and cost.

The anti-reflective tube 21 is of a type generally known to those skilled in the art. The tube includes internal saw-tooth circumferential ribs having a black matte finish.

The lens 15 is selected so that the illumination system 14 provides spatially uniform illumination or irradiance, particularly at the target distance from the sample. Spatially uniform means that the flux is uniform throughout the cross section of the illumination beam. In the current embodiment, the lens is a single bi-convex lens. Other suitable lenses are known to those skilled in the art.

II. Sensor System

A. First Stage

Figure 11:
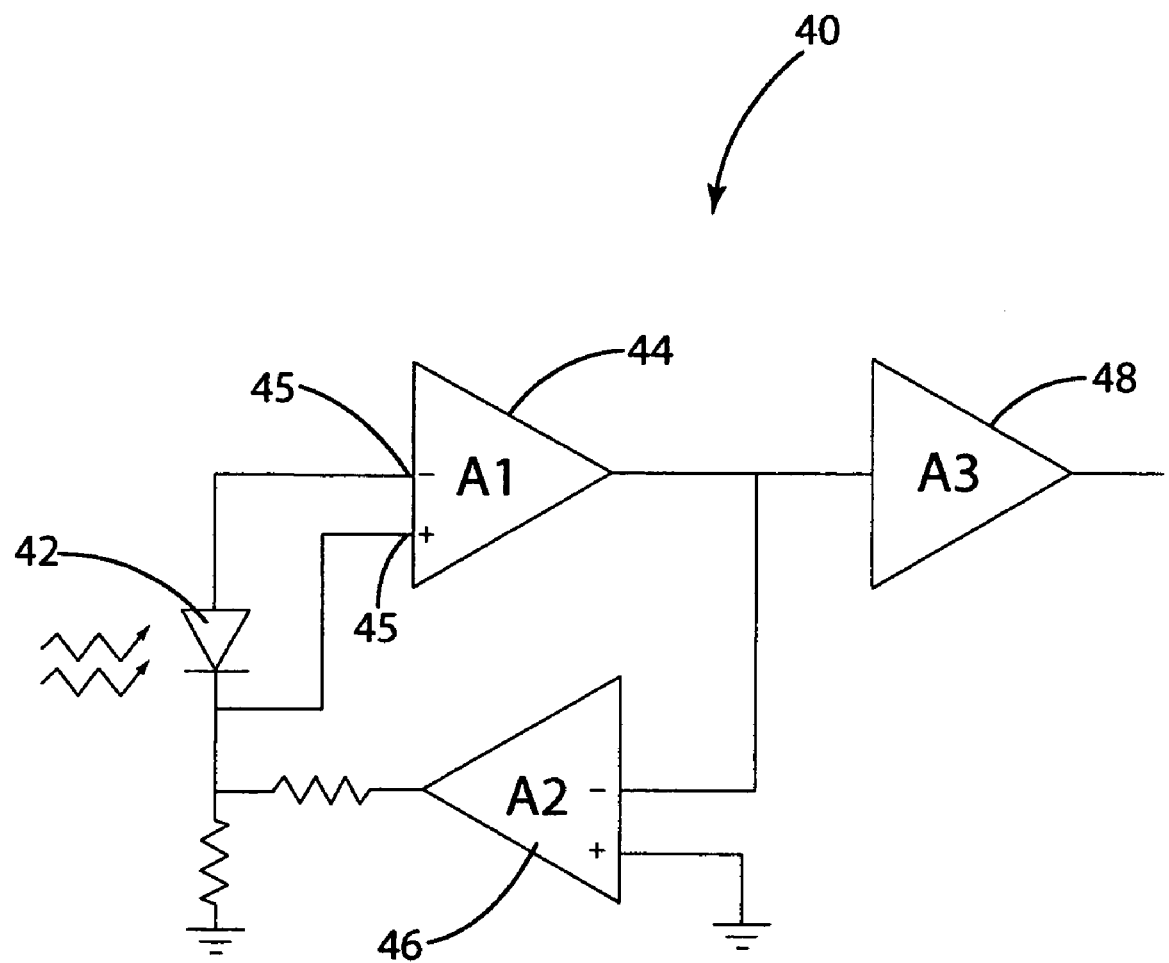
FIG. 11 is a schematic diagram of the first stage of the sensor system.

The first stage 40 of the sensor system 16 is illustrated in FIG. 11. The first stage includes a photodiode 42, a transimpedance amplifier 44, an integrator 46, and a high-pass filter 48. The first stage 40 is designed 1) to produce a signal proportional to the light reflected from the target sample (from both the modulated LEDs and from ambient light sources), 2) to amplify the signal, and 3) to cancel the ambient light component from the signal.

The photodiode 42 provides a current output proportional to the amount of light directed onto the photodiode. The transimpedance amplifier 44 includes a pair of inputs 45 connected across the photodiode 42. The output of the amplifier 44 is connected to the input of the integrator 46. The output of the integrator 46 is connected to both the photodiode 42 and to one of the inputs 45 of the transimpedance amplifier 44. In the current embodiment, the integrator 46 has a cutoff frequency of 250 Hz. This frequency is above the dominant frequency of most ambient light sources. These relatively low frequencies are fed back to the input of the transimpedance amplifier 44 opposite the photodiode 42 so that the effect of ambient light is canceled at the amplifier output. Consequently, the current output of the photodiode 42 is attributable only to light reflected from the modulated LEDs within the illuminator 20.

The first stage 40 has at least two benefits. First, at direct current (DC) and ambient light frequencies, the signal across the photodiode is essentially zero (i.e. the photodiode is essentially bootstrapped); and the output of the transimpedance amplifier at ambient light frequencies also is essentially zero. Because ambient light rejection occurs in the first stage of signal processing, extended dynamic range is enabled in later stages. Second, cancellation of the ambient light effect is performed away from the sensitive input of the transimpedance amplifier.

The output of the amplifier 44 is fed to a high-pass filter 48, whose cutoff frequency is approximately 1000 Hz. The high pass filter removes most of the residual ambient light component from the signal.

B. Sensing System Optics

Figure 14:
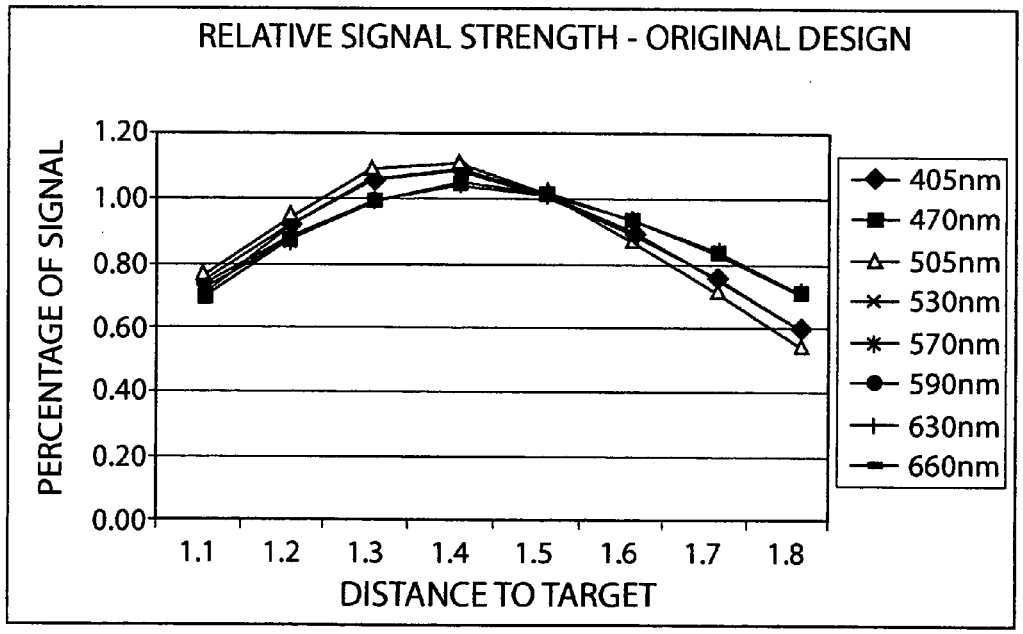
FIG. 14 is an illustration of the positional sensitivity of the instrument without the disclosed optics.

The positional sensitivity of a color measurement instrument is a critical parameter due to the combinatorial effect of two basic factors. First, the distance between the instrument and the target sample varies. This is attributable to the positional repeatability error of robotic fixtures and other industrial equipment. Additionally, the target area on the target sample may vary positionally from piece to piece. The second factor relates to the inverse square law. Specifically, the intensity of light radiating at multiple angles from a point decreases in intensity by the inverse square of the distance. Consequently, even at a nominal target distance of 1.5 inches, a variation of even 0.1 or 0.2 inch in the distance of the instrument from the target sample will introduce significant error into the measurement. The chart illustrated in FIG. 14 illustrates the variation in signal strength of a conventional instrument at various distances around a nominal target distance of 1.5 inches.

Figure 12:
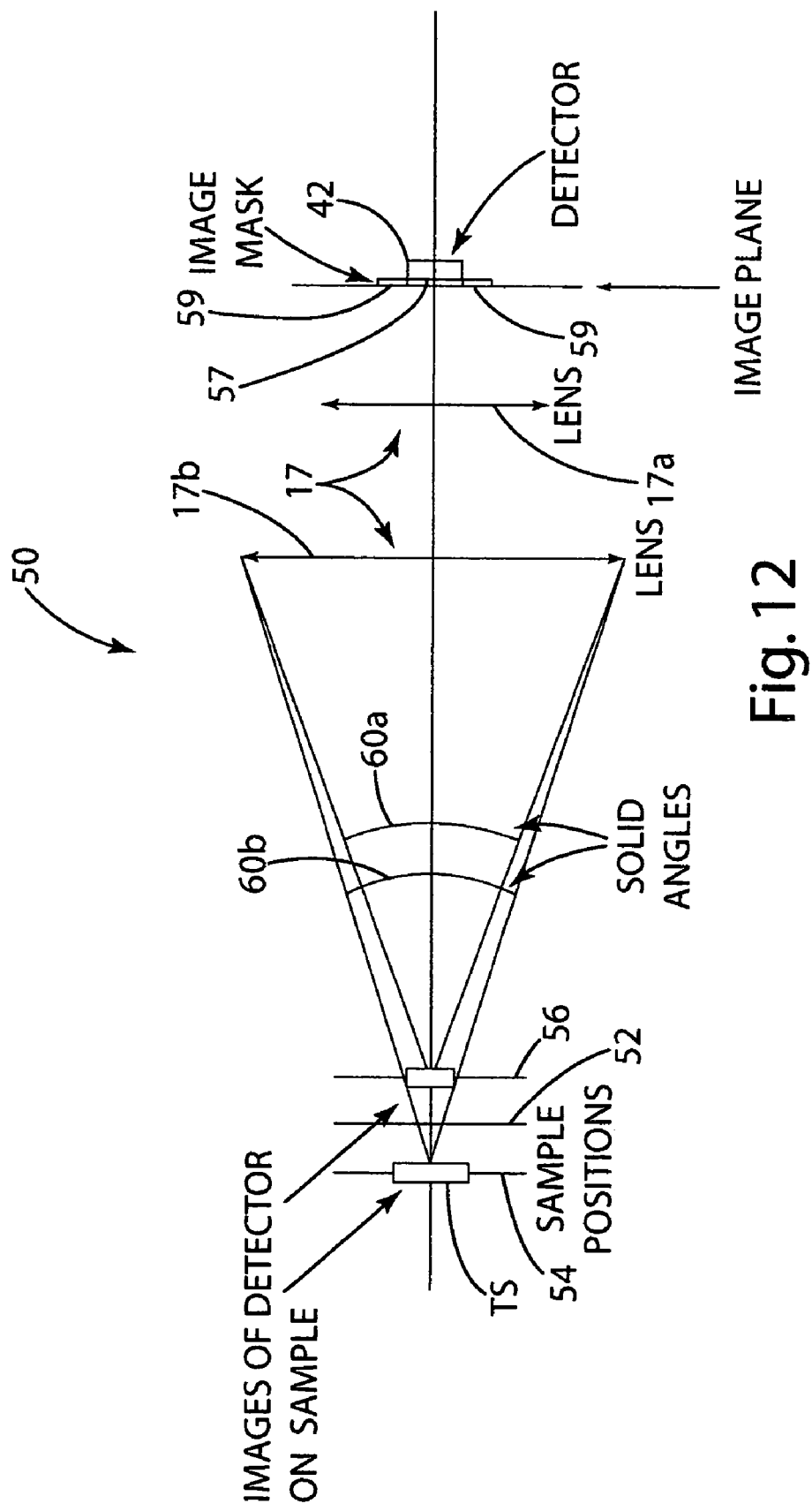
FIG. 12 is a schematic illustration of the optics portion of the sensor system.

The optical portion 50 of the sensing system 16 is schematically illustrated in FIG. 12. The preferred target sample position is illustrated at 52, and the acceptable target sample range extends between the extreme positions 54 and 56. The optical system 50 includes a lens system 17, whose focal length is the distance between the lens system and the preferred target sample position 52. The lens system 17 is between the detector 42 and the target sample TS. In the current embodiment the lens system 17 is a two-piece lens assembly including a plano-convex lens 17a and an aspheric lens 17b. Such a lens system is considered optically "fast"; it enhances light gathering efficiency; and it therefore improves signal strength. Alternatively, a single lens could work under the appropriate circumstances. The selection of the particular lens system 17 in view of this description would be routine by one skilled in the art.

The optical system 17 images the desired target area TA (see also FIG. 15) of the target sample TS onto a fixed-area 57 of the image plane of the photodiode 42. The size and shape of the fixed area are defined by a mask 59 adjacent to and/or on the image plane of the photodiode 42. The mask 59 provides a crisp edge to the fixed area. Preferably, the mask is thin and opaque to enhance the crispness of the edge; and the front of the mask is dark (e.g. black matte) to absorb stray light. In the current embodiment, the mask is a metal foil. Alternatively, the mask could be coated on, or otherwise applied to, the photodiode 42.

As illustrated in FIG. 12, the solid angle 60a collected by the lens system 17 is relatively large when the target sample TS is in the closest position 56. Conversely, the solid angle 60b is the smallest when the target sample TS is in its farthest position 54. In the closest position 56, the target area of the target sample imaged onto the detector 42 is smaller than the target area when the sample is in the preferred position 52, and the target area of the target sample TS imaged onto the detector when the target sample TS is in the farthest position 54 is relatively large. As long as the distance between the extreme sample positions 54 and 56 is small in comparison with the other distances, such as the focal distance of the lens system 17, then these two effects (solid angle and target area) will essentially cancel each other, providing a constant detector signal for samples with the same radiance. In other words, the product of the target area and the solid angle captured by the lens is the same in all cases between positions 54 and 56. The radiance of the samples is the same because the illumination field irradiance is the same (as discussed above) due to the search light illumination of the target sample TS. While the viewed area of the target (the target area) will vary slightly between positions 54 and 56, the tradeoff has been found to be acceptable.

Figure 13:
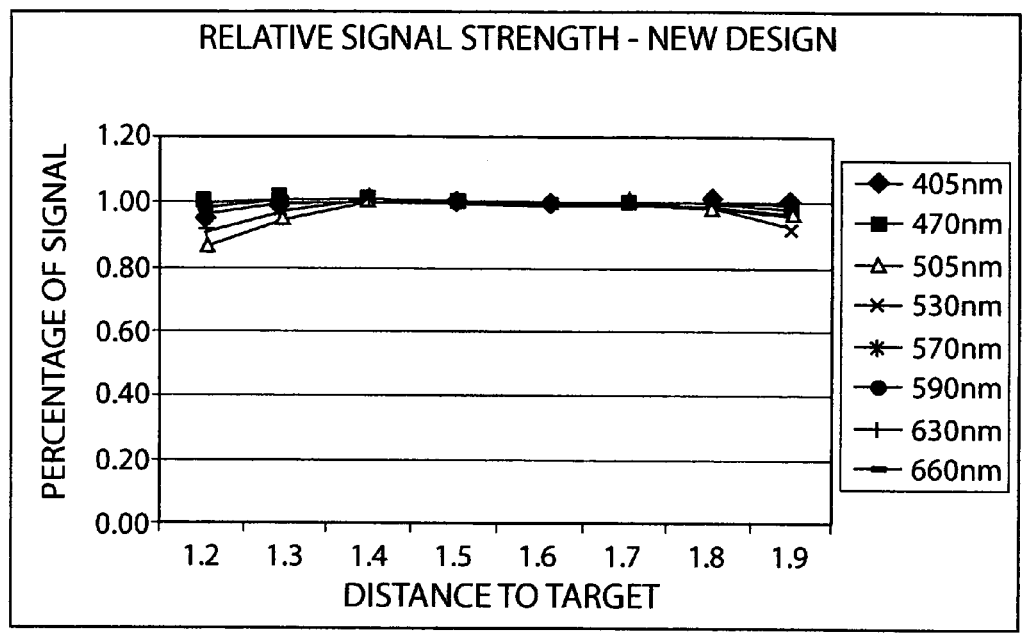
FIG. 13 is an illustration of the positional flexibility of the present instrument.

FIG. 13 illustrates the improved positional insensitivity (or positional flexibility) provided by the present design. When compared to FIG. 14, it will be noted that the measurement error at all LED frequencies is significantly reduced in the present design.

Figure 15:
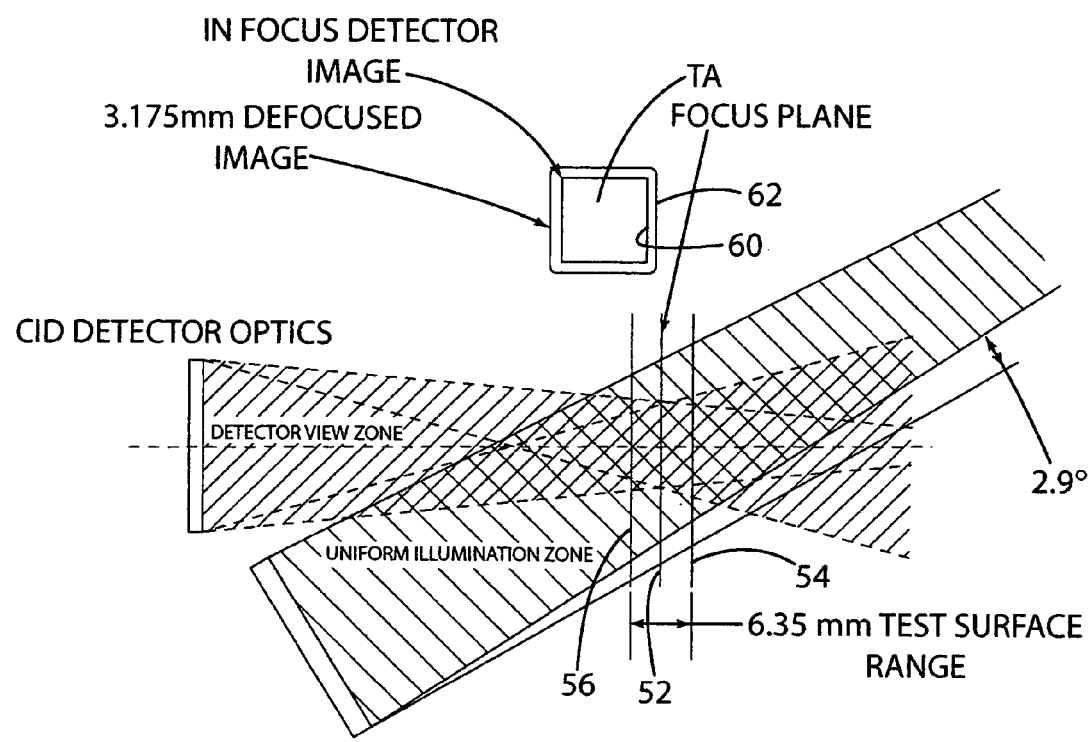
FIG. 15 is an illustration of the illumination zone and the detector view zone of the instrument.

FIG. 15 illustrates both the illumination optics and the sensor optics. These optics are interrelated by the issues of instrument geometry and mechanical packaging. In the current instrument, the angle between the axis of illumination and the axis of detection is approximately 30°. This geometry provides an appropriate balance and compromise among the following objectives and considerations:

1. Small package size
2. Large measurement spot size
3. "Fast" optics for good light gathering efficiency
4. Depth of field
5. Cost
6. Target discrimination
7. Positional insensitivity (or flexibility)
8. Easy targeting and setup FIG. 15 illustrates the current optical geometry. The outer perimeter 60 of the target area TA when the target sample TS is in the focal plane 52 (also known as the in focused detector image) is generally square. The outer perimeter 62 of the target area TA when the target sample TS is in either of the positions 54 or 56 (also known as the defocused detector image) is also generally square, but somewhat larger than the in focus detector image. The distance between the lens 17 and the desired position or focal plan 52 is 38.1 mm (1.5 inch), and the distance range is from 33.0 mm (1.3 inch) to 43.2 mm (1.7 inch). This results in a positional range of 13.2 mm (0.4 inch).

The above description is that of a preferred embodiment of the invention. Various alterations and changes can be made without departing from the spirit and broader aspects of the invention as set forth in the appended claims, which are to be interpreted in accordance with the principles of patent law including the Doctrine of Equivalents.

The embodiments of the invention in which an exclusive property or privilege is claimed are defined as follows:

1. A color measurement system comprising:
   illuminator means for illuminating a target sample;
   sensor means for sensing light reflected by the target sample, wherein said sensor means comprises:
     a photosensitive device having an image plane; and
     a mask adjacent said image plane and defining a target area of said target sample viewed by said photosensitive device; and
   lens means for imaging the target area of said target sample onto said sensor means when said lens means is within a predetermined distance range of the target sample, the target area varying in size with the distance between said lens means and the target sample, said lens means providing a generally uniform product of the target area as the first factor and the solid angle captured by said lens means as the second factor for all distances within said predetermined distance range.

2. A color measurement instrument as defined in claim 1 wherein said illuminator means provides generally spatially uniform illumination within the predetermined distance range.

3. A color measurement instrument comprising:
   an illuminator providing illumination to a target sample;
   a photo detector responsive to light reflected from the target sample, wherein said photo detector comprises:
     a photosensitive device having an image plane; and
     a mask adjacent said image plane and defining a target area of said target sample viewed by said photosensitive device; and
   a lens system for imaging the target area of the target sample onto said photo detector, the target area varying in size with variations in the distance between said lens system and the target sample, said lens system providing a generally uniform product of the target area times the solid angle captured by said lens system for relatively small variations in the distance between the lens system and the target sample.

4. A color measurement instrument as defined in claim 3 wherein said illuminator provides generally spatially uniform illumination.

5. A color measurement instrument, comprising:
   an illuminator;
   a detector;
   an imaging system structured and arranged to direct light reflected from an object to the detector such that a product of a target area of the object and a solid angle collected by the imaging system is substantially constant over a range of instrument-to-object distances; and
   a mask positioned between the imaging system and the detector.

6. The color measurement instrument of claim 5 wherein the illuminator comprises a plurality of light emitting diodes.

7. The color measurement instrument of claim 5 wherein the illuminator is structured and arranged to generate at least two different wavelengths of light.

8. The color measurement system of claim 5 wherein the detector comprises a photosensor.

9. The color measurement instrument of claim 8 wherein the photosensor comprises a photodiode.

10. The color measurement instrument of claim 5 wherein the imaging system is further structured and arranged to image the target area of the object onto the detector over the range of instrument-to-object distances.

11. The color measurement instrument of claim 5 wherein the imaging system is further structured and arranged to direct light reflected from the object to the detector such that illumination incident on the detector is substantially constant over the range of instrument-to-object distances.

12. The color measurement instrument of claim 5 wherein the imaging system comprises a convex lens and an aspheric lens.

13. The color measurement instrument of claim 12 wherein the convex lens is between the aspheric lens and the detector.

14. The color measurement instrument of claim 5 wherein the imaging system comprises a single lens.

15. The color measurement instrument of claim 5 wherein a maximum of the range is up to four tenths of an inch greater than a minimum of the range.

* * * * *